A. JENSEN.
STERILIZER AND DRIER.
APPLICATION FILED NOV. 16, 1916.
1,235,571.
Patented Aug. 7, 1917.
4 SHEETS—SHEET 1.
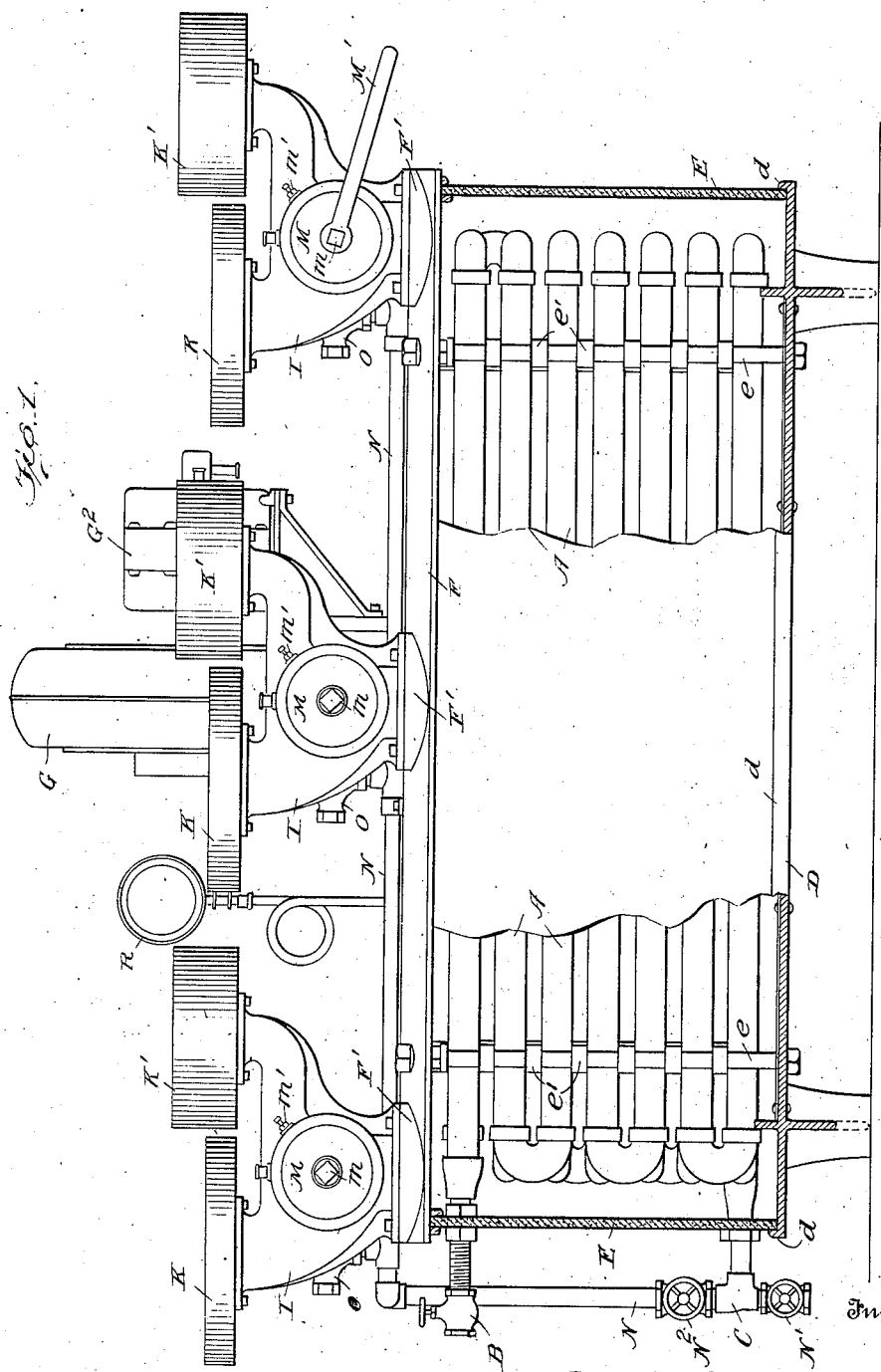

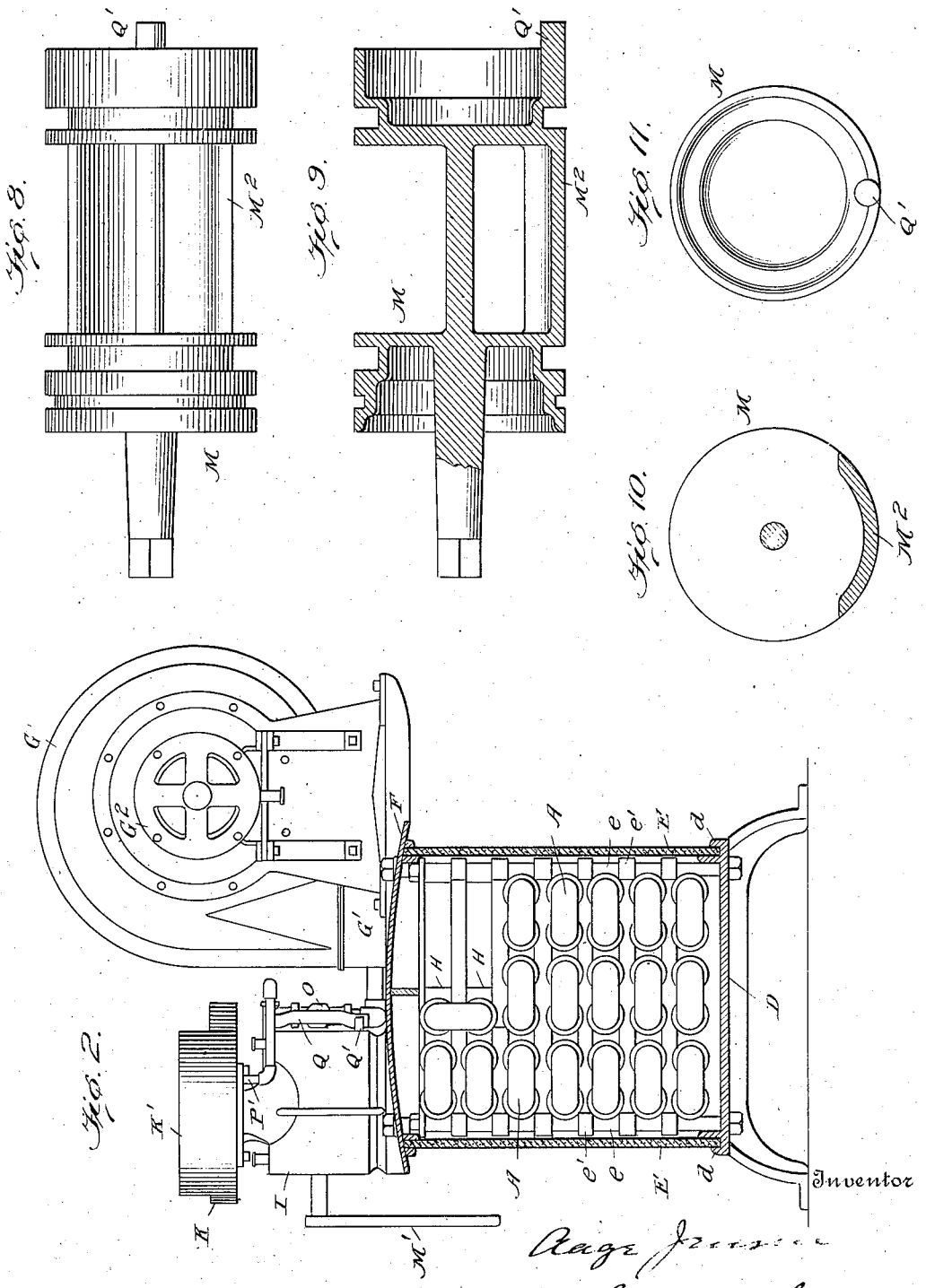

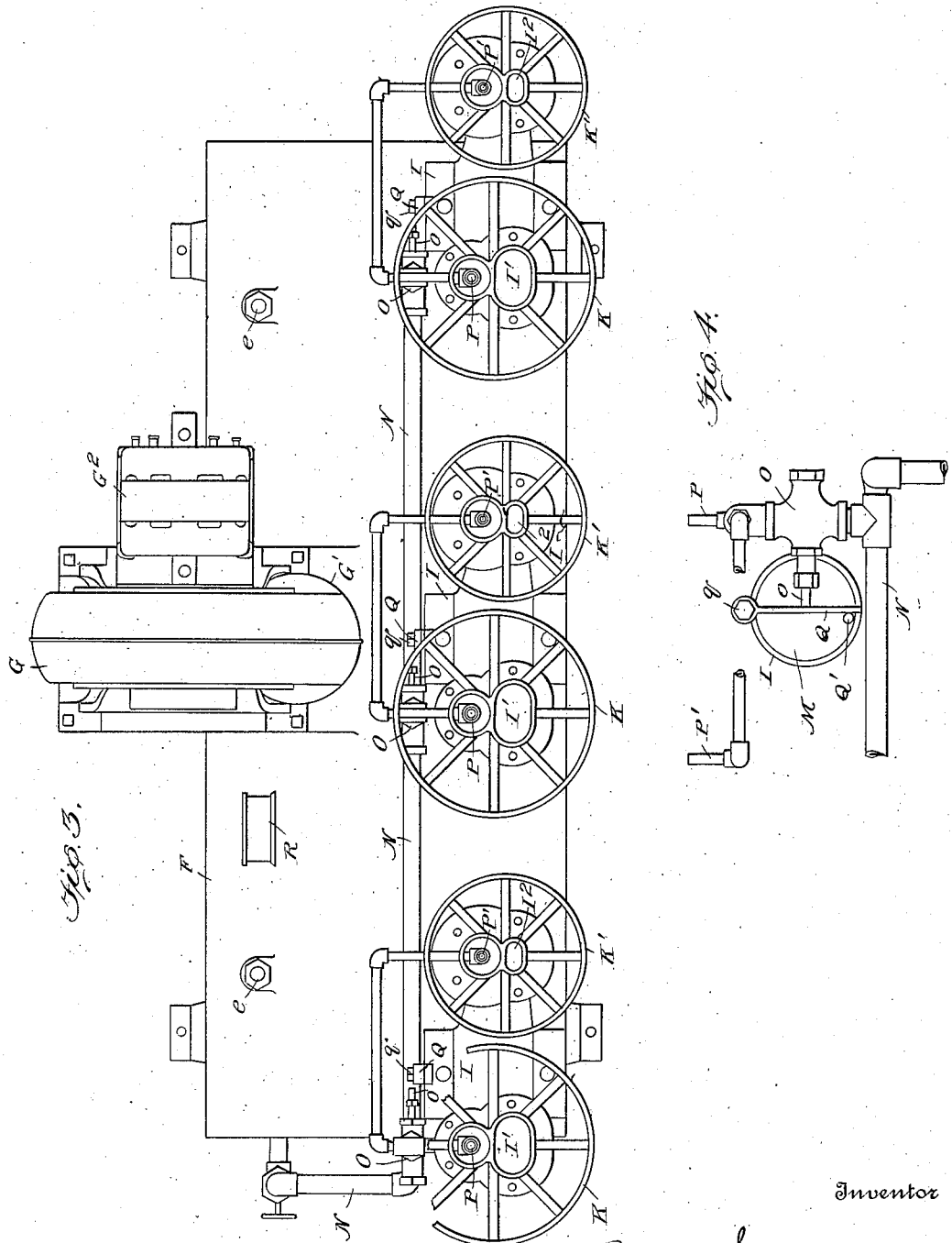

A. JENSEN.
STERILIZER AND DRIER.
APPLICATION FILED NOV. 16, 1916.
1,235,571.
Patented Aug. 7, 1917.
4 SHEETS—SHEET 4.
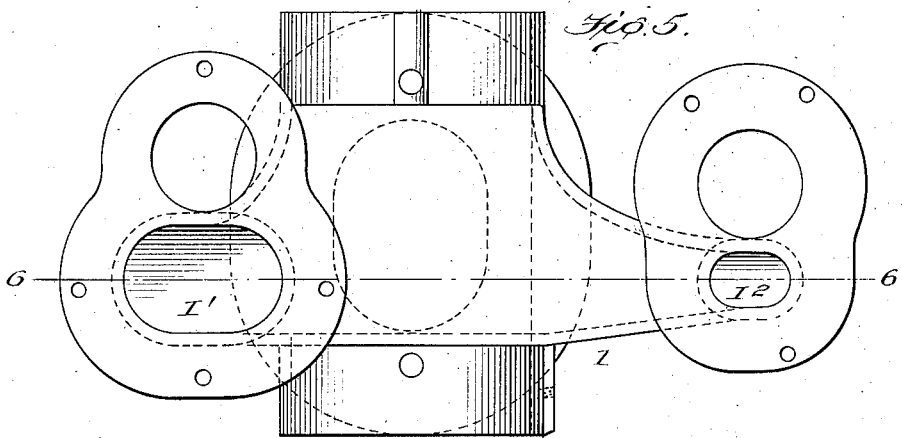
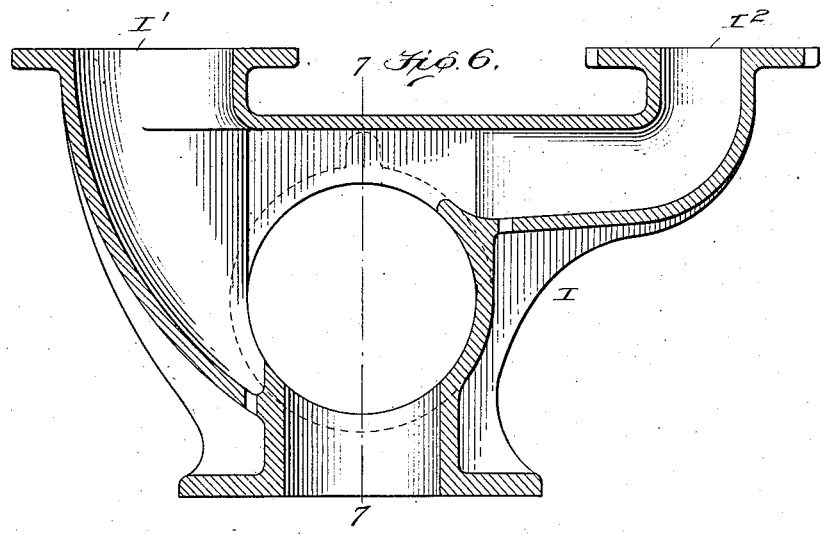
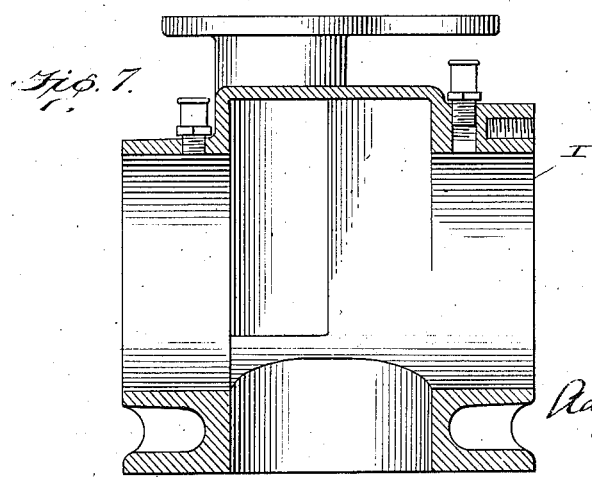

UNITED STATES PATENT OFFICE.

AAGE JENSEN, OF LONG ISLAND CITY, NEW YORK.

STERILIZER AND DRIER.

1,235,571.　　　　　Specification of Letters Patent.　　　Patented Aug. 7, 1917.

Application filed November 16, 1916. Serial No. 131,709.

*To all whom it may concern:*

Be it known that I, AAGE JENSEN, a citizen of the United States, residing at Long Island City, in the county of Queens and State of New York, have invented certain new and useful Improvements in Sterilizers and Driers; and I do hereby declare the following to be a full, clear, and exact description of the same, reference being had to the accompanying drawings, forming part of this specification.

The present invention relates to apparatus designed for use in the cleansing, sterilizing and drying of food containers, and in the particular embodiment of the invention illustrated and described in the following specification, the apparatus is more especially designed for sterilizing and drying cans or containers such as are commonly employed in the shipment and storage of milk and similar food products which are liable to germ infection, the construction, arrangement and correlation of the parts constituting the present invention being an improvement upon the structure shown in the prior patent to applicant, No. 958,138, dated May 8, 1909, as well as upon the structure shown in a prior application filed November 9, 1915, Serial No. 60,609.

The apparatus adopted for illustrating the improvements and as shown in the accompanying drawings, is designed, as before stated, for use in connection with milk and cream transportation and storage cans, but it is not intended to limit the invention to any particular construction adapting it for cleansing, sterilizing and drying a particular type of container, inasmuch as by simple and obvious modifications of the container supporting parts or increase or decrease in the number of such supporting parts, the apparatus can be adapted for coöperation with many different varieties of containers without changes or modifications in the construction of the effective working or operating parts.

Referring to the accompanying drawings,—

Figure 1 is a front elevation with parts broken away and in section of a sterilizing and drying apparatus embodying the present improvements.

Fig. 2 is a similar view looking at the right hand end of the apparatus shown in Fig. 1.

Fig. 3 is a top plan view of the same,

Fig. 4 is a detail view illustrating the coöperating control between the air and steam admission valves.

Fig. 5 is a top plan view on an enlarged scale of one of the valve chamber and receptacle supporting brackets.

Fig. 6 is a sectional view on the line 6—6 of Fig. 5.

Fig. 7 is a sectional view on the line 7—7 of Fig. 6.

Fig. 8 is a plan view of the air valve.

Fig. 9 is a longitudinal section through the same.

Fig. 10 is a transverse section in a plane at substantially the center of the valve shown in Figs. 8 and 9.

Fig. 11 is a view looking at the right hand or rear end of the valve shown in Fig. 8.

Like letters of reference in the several figures indicate the same parts.

The apparatus is particularly designed for use in creameries and dairy product plants, where it is desirable that each piece of apparatus, so far as may be, shall be self-contained, and inasmuch as in accomplishing the objects for which the apparatus is designed, it is necessary to have available a supply of water heated to a cleansing and sterilizing temperature, also a supply of steam at a temperature which will effect sterilization and create conditions necessary for rapid drying, and a supply of air in large volume also heated to a drying and preferably sterilizing temperature, means are provided whereby, due to an intermittent action of the several functions of the machine, namely, cleansing, sterilizing and drying, a single source of heat in the form of steam may be employed for providing the necessary water by condensation of the steam, supplying the steam itself, and supplying the heat for raising the temperature of the air to the desired degree. For example, the heating of the air will necessarily cause condensation of the steam and the water of condensation is utilized as the cleansing water, and by intermittent operation the discharge of the cleansing water will be automatically followed by a discharge of steam, and when the steam discharge is cut off and the air supply opened for drying, a further condensation of steam is effected for the next intermittent operation.

In said drawings, a steam coil is provided preferably in the form of a long length of pipe A arranged in parallel sections and connected by reverse bends, the steam supply being connected with one end of the pipe, preferably the top, as indicated by the steam inlet B, while the discharge is from the bottom, as indicated by the discharge connection C. This steam coil is mounted within a chamber, preferably formed by a bottom casting D having suitable supporting legs and an upwardly extending flange $d$ for the reception of the lower edges of side walls E, the latter being preferably formed with sheet metal inner and outer faces and internal non-heat conducting filler, such, for example, as asbestos packing. The upper edges of the side walls support a top casting F which in general contour is curved from front to rear and extends a distance beyond the side walls, thus forming a roof-like structure which will drain to the edges should any water or other substance tend to lodge thereon.

The top and bottom castings are held together, clamping the side walls between them, by long vertical bolts $e$, and the several lengths of the steam coil are spaced and held firmly in place by spacers $e'$ carried by the bolts so that the whole casing forms a compact and rigid structure.

The top casting F is formed with seats or bracket bases F' upon which the valve and receptacle supporting brackets and the pump base may be mounted, as will presently appear, and in addition, each bracket base is provided with a central opening for the flow of air into or out of the steam coil chamber.

An air forcing apparatus, preferably in the form of a rotary or centrifugal blower G is mounted on a central rear bracket base with its discharge opening communicating with the steam coil chamber preferably centrally on the rear portion of the top casting, as at G' and for driving this pump it may be combined with a power unit such as the electric motor $G^2$, although it will be understood that the motor is optional and a driving pulley may be substituted therefor in accordance with ordinary practice, depending upon the available power for operating the blower. Air from the blower is forced into the steam coil chamber and caused to flow downwardly over the portion of the coil in the rear part of the chamber by a baffle plate H which plate is preferably centrally arranged longitudinally of the chamber, and extends downwardly a sufficient distance to force the air entering the rear of the chamber to descend nearly to the bottom and then to ascend in the front portion of the chamber in reaching the discharge openings. The latter, in the particular apparatus illustrated, are openings in the three bracket bases F', shown in Fig. 1, although the number is optional and may be increased or decreased in accordance with the capacity desired. Three, however, have been shown by practice to be an economical number, inasmuch as a single attendant may, with three stations, occupy his time fully in handling the receptacles and at the same time provide sufficient intervals of time between the cleansing, sterilizing and drying of each receptacle or container to cause the desired intermittent action, whereby the water of condensation, steam and air heated to the proper temperature will be maintained for each operation.

Each of the three front bracket bases F' supports a valve and receptacle or container supporting bracket indicated generally by the letter I in the drawing and each bracket is provided with a valve seat for an oscillatory valve preferably a barrel or cylindrical valve shown in detail in Figs. 8 to 11. Above the valve seat the bracket is furcated or provided with two discharge branches I' and $I^2$, respectively, one preferably slightly larger than the other, and each adapted to form the support for a receptacle supporting spider or plate K, K'. The spider or plate K is adapted to receive and support an inverted milk can, for example, while the spider K' which is of somewhat smaller diameter is adapted to receive a milk can cover or top, the discharge openings in the bracket I being arranged more or less centrally of the plates so that air passing up through the bracket will be discharged into the receptacle and cover respectively.

The valve M, shown in Figs. 9 to 11, is mounted in the bracket so as to be capable of oscillatory movement therein, under the control of a handle M' applied to the valve stem $m$ and movement of the valve in one direction or the other is preferably limited by the set screw $m'$, best seen in Fig. 1. The valve is provided with a cut off portion $M^2$ which may be moved to close communication with the hot air chamber below, or so as to open said communication and permit the flow of heated air from the chamber up through the discharge bracket.

The lower or discharge end of the steam coil at C is in communication with a pipe connection N and this pipe connection is provided with two valves, one N' through which the steam coil may be blown out or the water of condensation discharged to a suitable drain, and the other $N^2$ through which the water of condensation and steam may pass to the receptacle or container supporting brackets, under supplementary valve control to be now described. The pipe connection N extends up to the top of the steam coil chamber, and thence horizontally in rear of the brackets I. In proximity to each valve M a discharge connection is led away from the pipe N, and for each discharge connection there is a quick action valve O, see Fig. 4, adapted to be opened by pressure on its valve stem o. From each quick action valve two discharge nozzles are adapted to discharge the water of condensation and steam upwardly through the plates K, K', respectively. One of these nozzles, that indicated at P, is adapted to discharge the water and steam through the container supporting plate K, while the other, indicated at P', is adapted to discharge the water and steam through the container cover supporting plate K'.

The valve stem o of the quick action valve O is located in position to be struck and operated by a lever Q pivotally mounted at q on the rear part of the bracket I, and this lever in turn is adapted to be operated by a stud or projection Q' on the rear end of the valve M, the arrangement being preferably such that while valve M is in position to close the communication with the hot air or steam coil chamber and without moving the valve to open that communication, it may be turned reversely a sufficient distance to effect the opening of the quick action steam valve O, and upon movement of the valve M in the opposite direction the said quick action steam valve will automatically close and a continued movement of the valve M will open the air communication, the interdependent relation being such that water, steam and air may be admitted at different times by movements of the handle of the valve M to different positions or in different directions, as the case may be, but that one supply may, if desired, be completely cut off before the other is opened.

A suitable steam pressure gage and siphon R is connected with the high pressure steam radiating coil in the chamber and located at a convenient point for observation by the attendant, and in the arrangement of the radiating coil in the chamber it is preferred that the steam shall enter the coil in that part of the chamber near the outlet for the air, although due regard must be had to a proper drainage so that water of condensation will flow down to the bottom of the coil where it may be discharged through the discharge connection C and when desired will accumulate in the lower portion of the coil in position to be blown out by the steam pressure during the rinsing operation.

In operation, and assuming that the machine has been installed conveniently in the operating room and it is desired to begin cleaning and sterilizing operations, all of the valves we will assume are closed. The valve B is first opened, permitting full pressure of steam to enter the coil. When the pressure records a constant pressure on the gage R, preferably between 80 and 100 pounds, the drain valve N' is opened to let out the accumulated water condensed in the coil, after which the valve is closed and the regulating valve $N^2$ is opened very slightly. This will permit full steam pressure on the pipe connection N. The fan or blower is then started and operations are commenced by placing one can and cover over the respective openings in one of the brackets I. Conveniently, the can is inverted and stands up-side-down on the plate or spider provided for that purpose, and the cover is similarly supported on its plate or spider. The air valve operating handle M' is then moved so that the extension on its rear presses the lever Q against the stem of the quick acting steam valve O sufficiently to open the valve. This will permit a spray under pressure of all the condensed water that has accumulated in the steam coil, which spray will strike the inner surfaces of the can and cover, rinsing the same thoroughly. When all condensed water has been forced out of the coil, the supply will automatically become first a saturated moist steam and gradually change to dry steam only. Another can and container is now placed over the next bracket I, when the handle M' at the first bracket is reversed, thereby permitting the quick acting valve to close and at the same time opening the air valve, permitting hot sterile air to pass from the heating chamber up through the openings of the bracket into and around the container and cover. The operations are continued at each succeeding table and at a rate of speed corresponding to the capacity of the machine. The effect of the operation is to first thoroughly rinse by the use of a regulated amount of condensed sterile water, next, to thoroughly sterilize by the steam that automatically follows the discharge of the condensed water, and immediately succeeding this, the drying is effected by hot sterile air which removes every particle of moisture from the can and cover and makes future treatment unnecessary, regardless of the length of time the can is left standing, provided, of course, it is not permitted to become recontaminated.

Long continued use of an apparatus such as that herein described shows that effective practical results can be obtained if operated as follows: The can and covers should be subjected to the rinsing effect for about six seconds, the temperature of the water varying from 212° to 214° F. The cans should be subjected to the action of steam for a period of about fifteen seconds, and the steam will likewise be at a temperature of from 212° to 214° F. For the drying operation the cans should be subjected to the hot air blast for a period of about twenty-five seconds and the air should register about 225° F.

What is claimed is:
1. In an apparatus such as described, the combination with a hot air chamber and a heat radiating steam coil in said chamber, of a blower for forcing air to travel through said chamber, a support for a container to be cleansed and sterilized, discharge outlets for the hot air chamber and steam coil both arranged in position to discharge into a container held by the support, and correlated valves controlling the said hot air and steam discharge outlets, whereby either may be opened and either or both closed.

2. In an apparatus such as described, the combination with a hot air chamber, a heat radiating steam coil in said chamber having a steam inlet at the top and a discharge connection at the bottom, and a blower communicating with said chamber for forcing air into the same, of a support for a container to be cleansed and sterilized, a discharge outlet for the hot air chamber leading from the top of the hot air chamber into a position to discharge into a container held by the support, an outlet connection for the steam coil leading from the bottom of the steam coil into a position to discharge into a container held by the support, and correlated valve mechanisms controlling said air and steam discharge connections, whereby the discharge of water of condensation, steam and hot air may be effected in succession.

3. In an apparatus such as described, the combination with a hot air chamber, a heat radiating steam coil in said chamber and a blower for forcing air into the chamber, a furcated bracket mounted on the chamber and having air discharge passages through its branches, container supports mounted on the arms of said bracket, a valve controlling the flow of air through the bracket, a steam discharge connection leading from the bottom of the coil into position to discharge through the container supports, and a valve for controlling the steam discharge.

4. In an apparatus such as described, the combination with a hot air chamber, a heat radiating steam coil in said chamber, and a blower for forcing air through the chamber, a support for a container to be cleansed and sterilized, a discharge outlet for the hot air chamber located in position to discharge into a container held by the support, a steam discharge connection leading from the bottom of the coil into a position to discharge into said container and two valves located in said steam discharge connection, one for closing and opening the discharge and the other for regulating the steam passing to the discharge.

5. In an apparatus such as described, the combination with a hot air chamber, a heat radiating steam coil in said chamber and a blower for forcing air to travel through the chamber, of a support for a container to be cleansed and sterilized, a discharge outlet for the hot air chamber located in position to discharge into the container held by the support, a steam discharge leading from the bottom of the steam coil into a position to discharge into said container, a regulating valve in said steam discharge for controlling the flow of steam, and correlated valves located in the air and steam discharges respectively for opening and closing the same.

6. In an apparatus such as described, the combination with a hot air chamber, a heat regulating steam coil in said chamber, and a blower communicating with the chamber for forcing air into the same, of a plurality of supports for containers to be cleansed and sterilized mounted on said hot air chamber, independent air discharge ducts leading from the chamber to the respective supports, a steam discharge pipe connection leading from the bottom of the steam coil and having a regulating valve therein, independent discharge nozzles supplied by said pipe and located respectively in proximity to the respective container supports, independent valves for said discharge nozzles, and independent air valves controlling the discharge of air from the chamber to the supports.

7. In apparatus such as described, the combination with a hot air chamber, a heat radiating steam coil in said chamber and a blower communicating with said chamber for forcing air into the same in contact with the coil, a plurality of brackets mounted on said chamber and having air discharge ducts therethrough, container supports mounted on said brackets in position to hold containers for receiving the discharged air, steam nozzles located in position to discharge into containers held by said brackets, a pipe connection leading from said nozzles to the bottom of the steam coil in the chamber, whereby water of condensation and steam will be discharged in succession, valves located respectively in the brackets and nozzles for opening and closing the air and steam discharge, and independent operating handles for the respective brackets, whereby the air valve and steam valve may be opened in succession, the first to permit the successive discharge of water of condensation and steam, and the second to permit of the discharge of air, whereby the air in the air chamber is reduced in temperature to effect condensation of steam in the production of water for the next operation.

AAGE JENSEN.